United States Patent
Marumoto

(10) Patent No.: US 8,062,161 B2
(45) Date of Patent: Nov. 22, 2011

(54) TRACTION-DRIVE TYPE DRIVING-FORCE TRANSMISSION MECHANISM AND IMAGE FORMING APPARATUS EQUIPPED THEREWITH

(75) Inventor: Takeshi Marumoto, Osaka (JP)

(73) Assignee: Kyocera Mita Corporation (JP)

( * ) Notice: Subject to any disclaimer, the term of this patent is extended or adjusted under 35 U.S.C. 154(b) by 875 days.

(21) Appl. No.: 12/112,008

(22) Filed: Apr. 30, 2008

(65) Prior Publication Data

US 2008/0276756 A1 Nov. 13, 2008

(30) Foreign Application Priority Data

| May 8, 2007 | (JP) | 2007-123211 |
| Nov. 13, 2007 | (JP) | 2007-294298 |
| Nov. 13, 2007 | (JP) | 2007-294299 |
| Nov. 13, 2007 | (JP) | 2007-294300 |
| Nov. 13, 2007 | (JP) | 2007-294301 |

(51) Int. Cl.
*F16H 15/48* (2006.01)

(52) U.S. Cl. ........................ 475/191; 475/183

(58) Field of Classification Search .............. 475/183, 475/185, 191, 165
See application file for complete search history.

(56) References Cited

U.S. PATENT DOCUMENTS

| 2,896,479 | A | * | 7/1959 | Kelbel | 475/295 |
| 4,098,145 | A | * | 7/1978 | Dickinson | 475/186 |
| 4,126,060 | A | * | 11/1978 | Rineer | 475/183 |
| 4,302,988 | A | * | 12/1981 | Takahashi et al. | 475/114 |
| 4,616,517 | A | * | 10/1986 | Esmay | 74/10.45 |
| 4,986,556 | A | * | 1/1991 | Hartmann | 280/260 |
| 6,420,807 | B1 | * | 7/2002 | Tsujimoto et al. | 310/83 |
| 7,163,461 | B2 | * | 1/2007 | Komeyama et al. | 464/136 |
| 7,341,539 | B2 | * | 3/2008 | Huber et al. | 475/331 |

FOREIGN PATENT DOCUMENTS

| CN | 2321977 Y | 6/1999 |
| JP | 2000-329206 | 11/2000 |

* cited by examiner

*Primary Examiner* — Justin Holmes

(74) *Attorney, Agent, or Firm* — Gerald E. Hespos; Michael J. Porco

(57) ABSTRACT

A traction-drive type driving-force transmission mechanism includes a sun roller having a first central axis about which the sun roller is rotatable. Shafts are provided and each has a second central axis aligned parallel to the first central axis. Planetary rollers are arranged rotatably along an outer peripheral surface of the sun roller and are supported respectively by the shafts. A guide member guides each shaft displaceably in a radial direction of the sun roller while maintaining the parallel relationship between the first and second central axes. A pressing member presses each planetary roller against the outer peripheral surface of the sun roller so that a driving force can be transmitted by a traction force between the sun roller and each of the planetary rollers.

12 Claims, 11 Drawing Sheets

TRACTION-DRIVE TYPE DRIVING-FORCE TRANSMISSION MECHANISM AND IMAGE FORMING APPARATUS EQUIPPED THEREWITH

BACKGROUND OF THE INVENTION

1. Field of the Invention

The present invention relates to a traction-drive type driving-force transmission mechanism capable of transmitting a driving force or reducing a rotational speed, through means of a traction force generated between rollers, and an image forming apparatus equipped with the traction-drive type driving-force transmission mechanism.

2. Description of the Related Art

As a prior art relating to traction-drive type driving-force transmission mechanisms, there has been known a mechanism which comprises a sun roller coupled to a rotary shaft, a plurality of planetary rollers arranged around the sun roller, and a carrier supporting respective planetary shafts of the planetary rollers (see, for example, JP 2000-329206A, which will hereinafter be refereed to as "D1"). The mechanism disclosed in the D1 is designed such that each of the planetary rollers is rotated while being circulated outside the sun roller and along a pair of orbit rings, through means of a traction force generated between the sun roller and the planetary roller, and the circulating movement is transmitted from the carrier to an output shaft.

In order to generate a sufficient traction force between the sun roller and each of the planetary rollers, it is necessary to strongly press the planetary roller against the sun roller (i.e., bring the planetary roller into press contact with the sun roller) in the presence of a lubricant while rotatably supporting the planetary roller by the planetary shaft. For this purpose, in the mechanism disclosed in the D1, a certain gap is ensured between the planetary shaft and the planetary roller, and two inclined portions formed on axially opposite lateral sides of the planetary roller are sandwiched between the pair of orbit rings in such a manner that an inclined surface formed in an inner periphery of each of the orbit rings is brought into press contact with an inclined surface formed in an outer periphery of a corresponding one of the inclined portions so as to press the planetary roller against an outer peripheral surface of the sun roller.

In the mechanism disclosed in the D1, each of the planetary rollers is adapted to be freely displaceable relative to the corresponding planetary shaft within the range of the gap, although the planetary shaft is fixed to the carrier. Thus, when the orbit rings are brought into press contact with the respective inclined surfaces of the planetary rollers, the planetary rollers are strongly pressed against the sun roller, so that a required traction force can be generated in the presence of a lubricant.

In the mechanism disclosed in the D1, the planetary shaft and the planetary roller are arranged to define a gap therebetween. This arrangement involves a possibility that a rotation axis (rotation center) of the planetary roller is displaced at a certain amount of angle with an axis (center line) of the planetary shaft. Thus, when the planetary roller is pressed against the sun roller, the inner peripheral surface of the planetary roller is likely to be slightly inclined relative to the outer peripheral surface of the sun roller. In this case, a pressure distribution on the inner peripheral surface of the planetary roller becomes uneven in an axial direction of the planetary roller, i.e., so-called "edge contact" occurs, to cause uneven wear on the outer peripheral surface of the sun roller.

SUMMARY OF THE INVENTION

It is an object of the present invention to provide a technique capable of generating an axially even traction force between the planetary roller and the sun roller.

In order to achieve the above object, according to one aspect of the present invention, there is provided a traction-drive type driving-force transmission mechanism which comprises: a sun roller having a first central axis wherein the sun roller is rotatable about the first central axis; a plurality of shaft members each having a second central axis wherein each of the shaft members is disposed such that the second central axis is aligned with a respective one of a plurality of adjacent axes parallel to the first central axis; a plurality of planetary rollers rotatably arranged along an outer peripheral surface of the sun roller while being supported by respective ones of the shaft members; a guide member adapted to guide each of the shaft members displaceably in a radial direction of the sun roller while maintaining the parallel relationship between the first central axes and the second central axes; and a pressing member adapted to press each of the planetary rollers against the outer peripheral surface of the sun roller so as to allow a driving force to be transmitted through means of a traction force between the sun roller and each of the planetary rollers.

According to another aspect of the present invention, there is provided an image forming apparatus which comprises: an image forming section including at least a photosensitive drum, or a photosensitive drum and an intermediate transfer belt; a driving source operable to generate a driving force for driving the photosensitive drum, or at least one of the photosensitive drum and the intermediate transfer belt; and a traction-drive type driving-force transmission mechanism operable to transmit the driving force of the driving source to a rotary shaft of the photosensitive drum, or a driving member of the intermediate transfer belt, wherein the traction-drive type driving-force transmission mechanism has the above feature.

DETAILED DESCRIPTION OF THE PREFERRED EMBODIMENTS

Figure 1A:
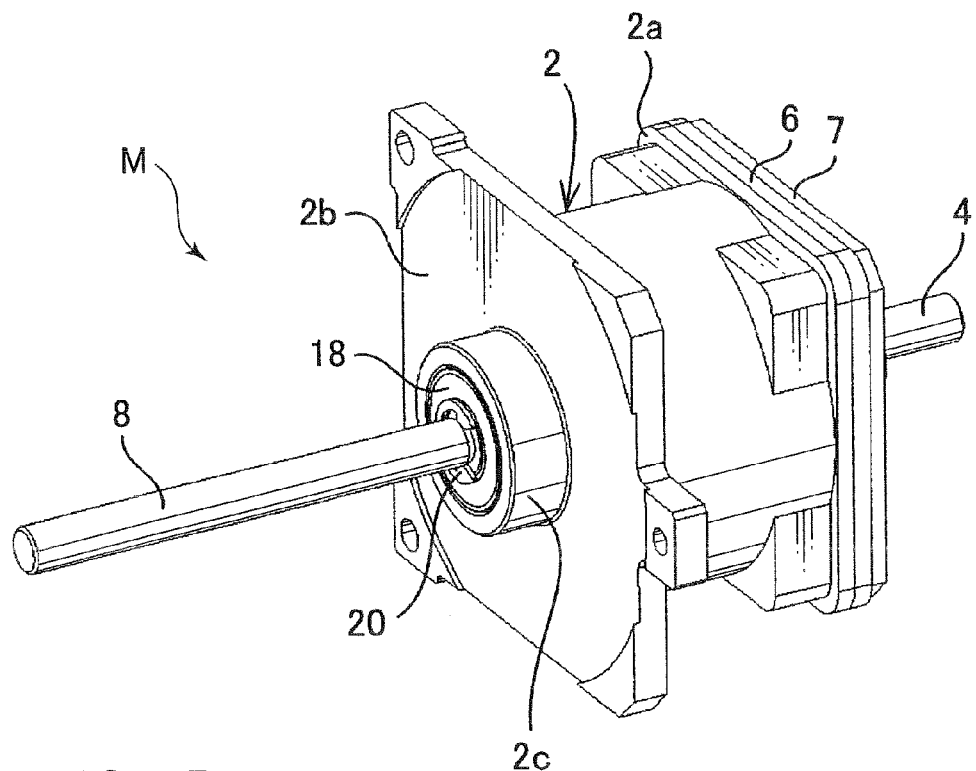
FIGS. 1A and 1B are perspective views showing an external appearance of a traction-drive type driving-force transmission mechanism according to one embodiment of the present invention, when viewed from two different directions.
Figure 1B:
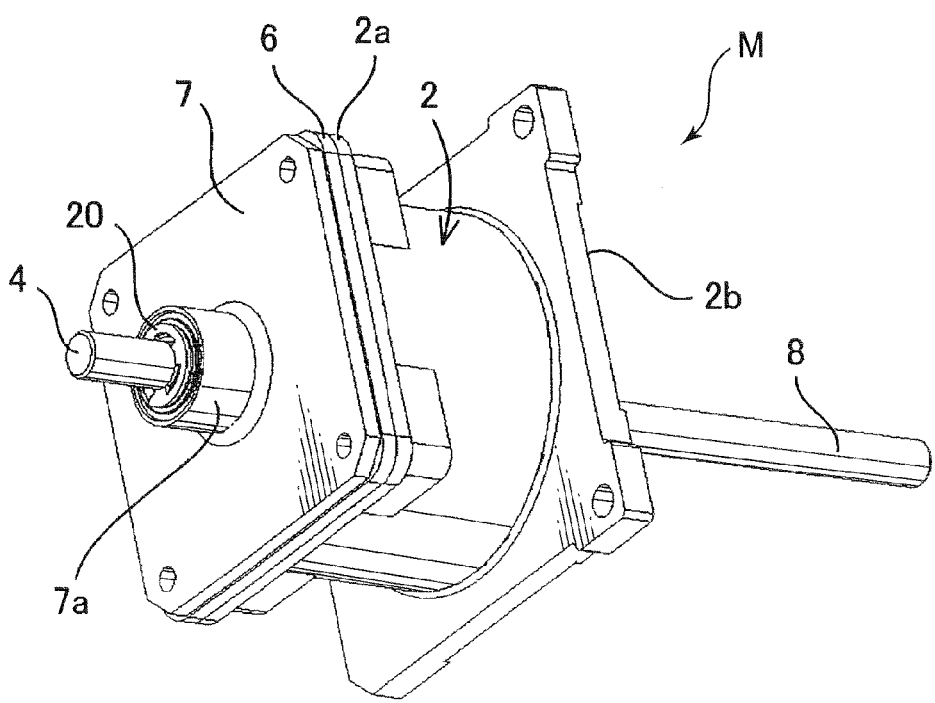

With reference to the drawings, the present invention will be specifically described based on an embodiment thereof. FIGS. 1A and 1B are perspective views showing an external appearance of a traction-drive type driving-force transmission mechanism M according to one embodiment of the present invention, when viewed from two different directions. The traction-drive type driving-force transmission mechanism M includes a cylindrical-shaped casing 2, a sun roller 4, an end plate 6, a bearing plate 7, and an output shaft 8.

The casing 2 has a rectangular-shaped flange 2a formed at one end thereof, and the flange 2a is formed with an opening which is closed by the end plate 6 having a shape corresponding to that of the flange 2a. The casing 2 further has a rectangular-shaped flange 2b formed at the other end on an opposite side of the flange 2a. The traction-drive type driving-force transmission mechanism M is adapted to be connected to a driving source, such as a motor (not shown), disposed on the side of the flange 2a.

One end (i.e., distal end) of the sun roller 4 is received inside the casing 2, and the output shaft 8 is disposed to protrude from the inside of the casing 2 and extend in an opposite direction of the sun roller 4. The bearing plate 7 is attached to the end plate 6, and formed with a boss portion 7a in a central region thereof. The boss portion 7a is internally provided with two bearings (not shown), and the sun roller 4 is supported by the bearing plate 7 (i.e., casing 2) through the two bearings. The flange 2b also has a boss portion 2c which is formed in a central region thereof and internally provided with two bearings (not shown). The output shaft 8 is supported by the flange 2b (i.e., casing 2) through the two bearings.

Figure 2:
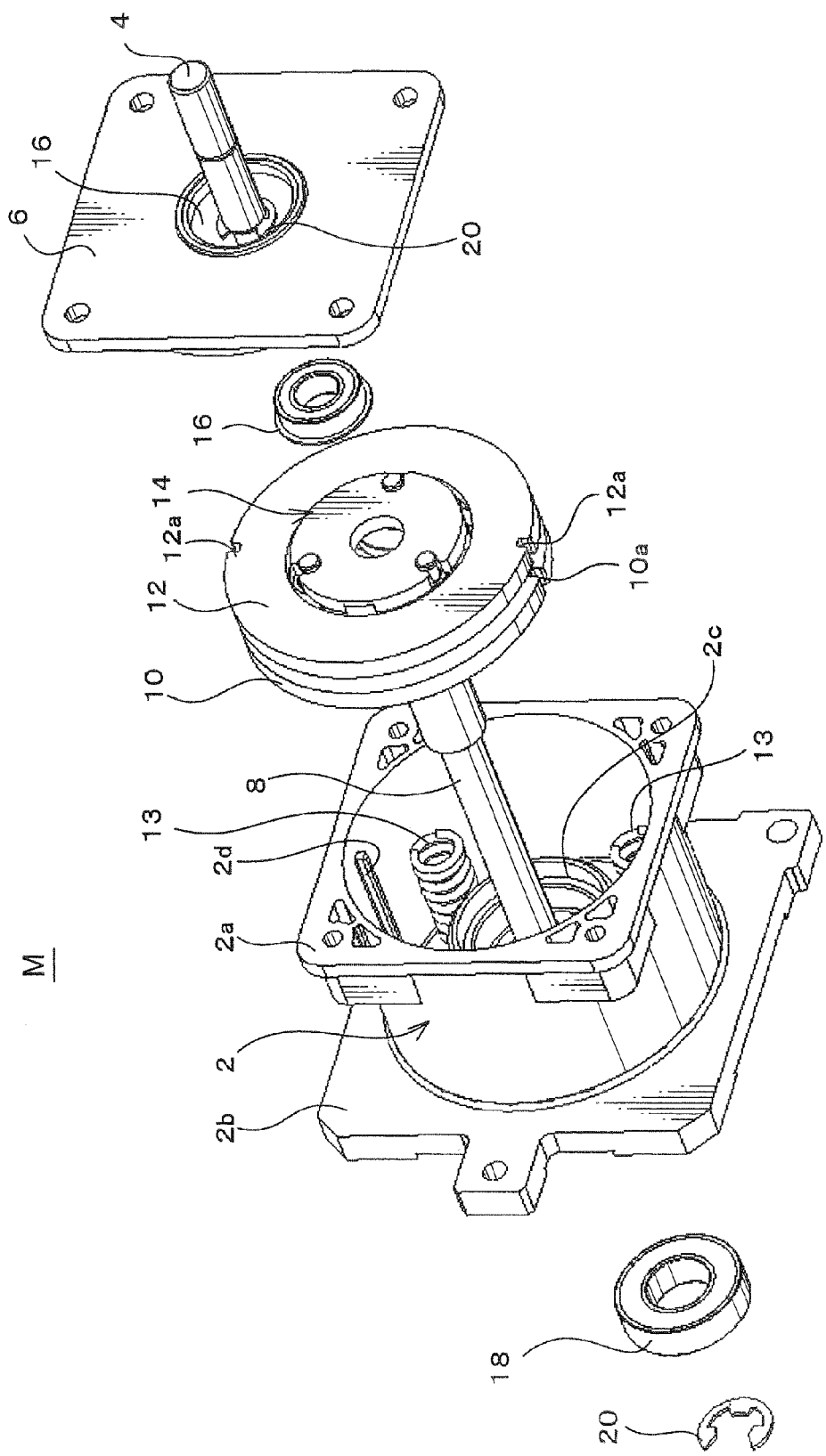
FIG. 2 is an exploded perspective view of the traction-drive type driving-force transmission mechanism.

FIG. 2 is an exploded perspective view of the traction-drive type driving-force transmission mechanism M. The casing 2 receives therein one end (i.e., base end) of the output shaft 8 together with first and second outer ring 10, 12 and a planetary carrier 14. Although not specifically illustrated in FIG. 2, the planetary carrier 14 comprises first and second carrier members, and three planetary rollers are supported by the two carrier members. The carrier members and the planetary rollers will be described later with reference to another figure.

Each of the outer rings 10, 12 has an outer diameter slightly less than an inner diameter of the casing 2. This dimensional relationship is set to allow each of the outer rings 10, 12 to be fitted in the casing 2 highly accurately with a slight gap therebetween. The casing 2 has a two line-shaped protrusions 2d (only one of them is shown in FIG. 2) formed on an inner surface thereof. Each of the line-shaped protrusions 2d is formed to extend parallel to respective central axes of the sun roller 4 and the output shaft 8. The outer rings 10, 12 are formed, respectively, with grooves 10a, 12a correspondingly to respective ones of the two line-shaped protrusions 2d, so that, when the outer rings 10, 12 are fitted in the casing 2, the line-shaped protrusions 2d are received in the respective grooves 10a, 12a. This allows each of the outer rings 10, 12 fitted in the casing 2 to be restricted in displacement in a rotation direction (i.e., about the output shaft 8).

Three compression coil springs 13 (only two of them are shown in FIG. 2) are disposed inside the casing 2. In a post-assembly state of the traction-drive type driving-force transmission mechanism M, each of the compression coil springs is in contact with a lateral surface of the first outer ring 10 to have a repulsion force (elastic force) in a direction allowing the first outer ring 10 to come close to the second outer ring 12.

Two bearings 16 are disposed around an outer periphery of the sun roller 4 in spaced-apart relation to each other in a longitudinal direction of the sun roller 4. In FIG. 2, the bearing plate 7 is omitted. Typically, the casing 2 is internally filled with a lubricant (grease). The two bearings 16 rotatably support the sun roller 4 and seal the grease filled in the casing 2. Further, two bearings 18 (only one of them is shown in FIG. 2) are disposed around an outer periphery of the output shaft 8 in spaced-apart relation to each other in a longitudinal direction of the output shaft 8. The two bearings 16 rotatably support the output shaft 8 and seal the grease filled in the casing 2. Each of the sun roller 4 and the output shaft 8 is provided with a snap ring 20 at an appropriate position thereof.

Figure 3:
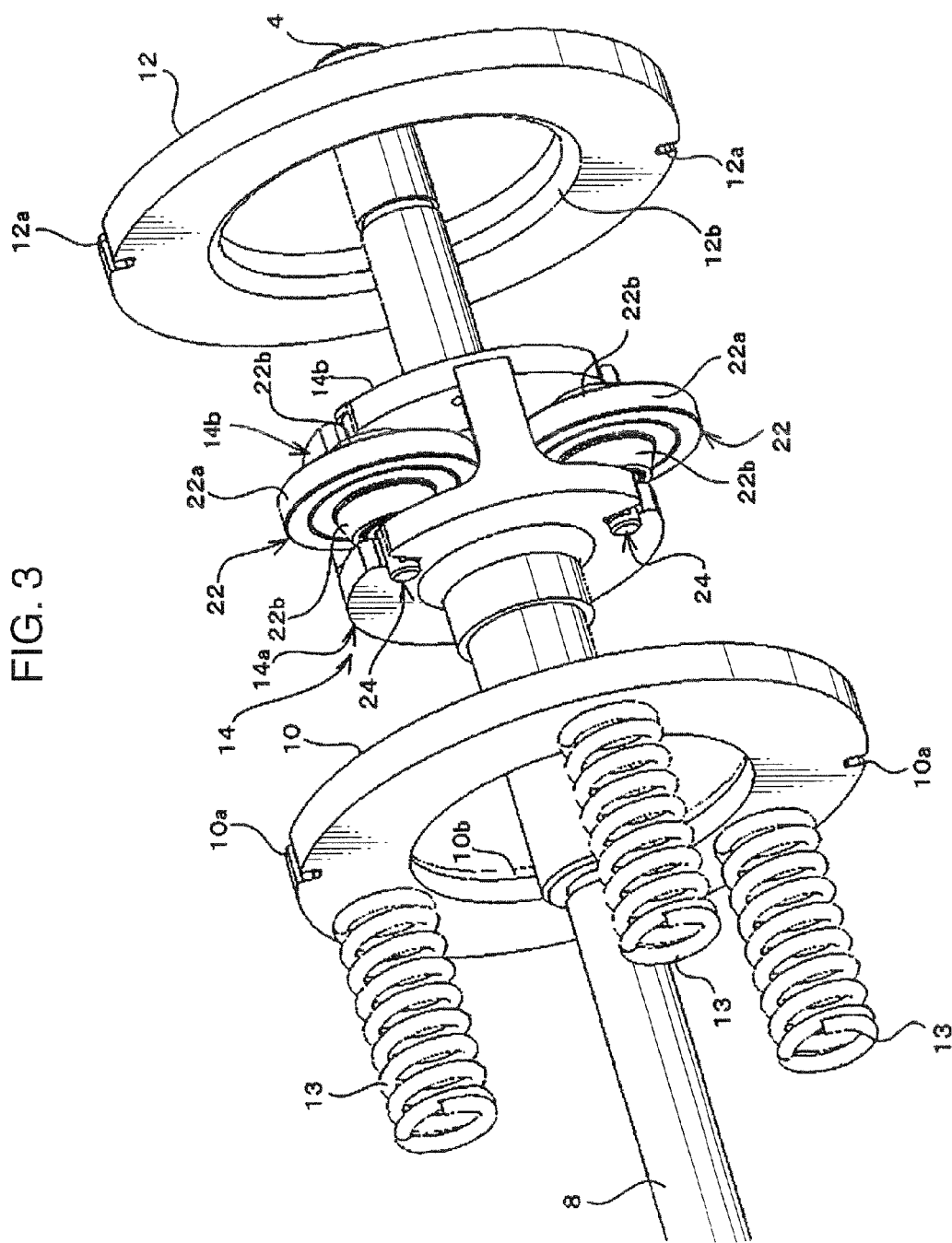
FIG. 3 is an exploded perspective view showing a state after two outer rings are spaced apart from a planetary carrier.
Figure 4:
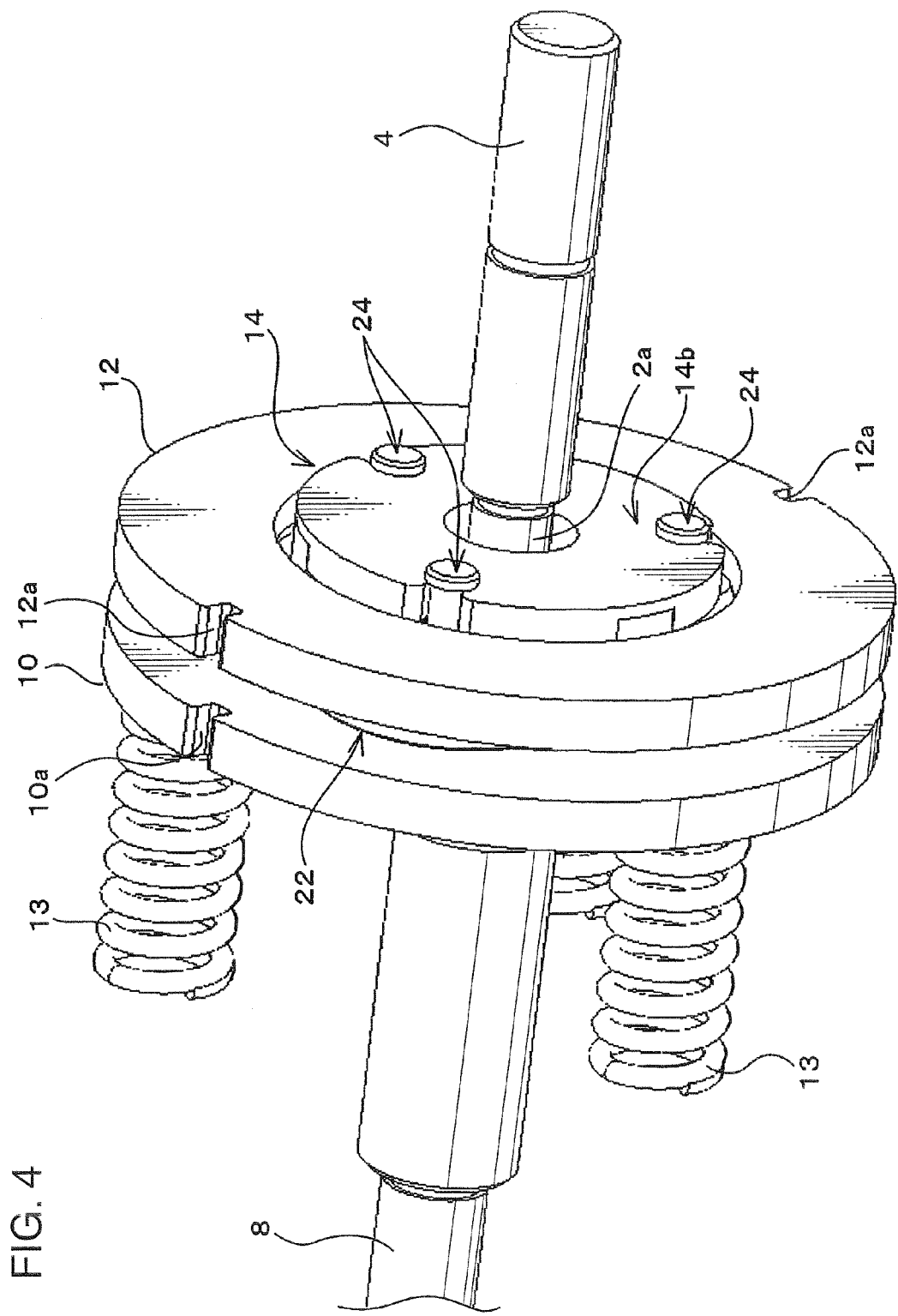
FIG. 4 is a perspective view showing a state after the two outer rings are moved closer to each other from their positions illustrated in FIG. 3.

FIG. 3 is an exploded perspective view showing a state after the first and second outer rings 10, 12 are spaced apart from the planetary carrier 14. FIG. 4 is a perspective view showing a state after the first and second outer rings 10, 12 are moved closer to each other. The planetary carrier 14 comprises a circular plate-shaped first carrier member 14a (i.e., first circular plate) and a circular plate-shaped second carrier member 14b (i.e., second circular plate). Three planetary rollers 22 (only two of them are shown in FIG. 2) are supported by the first and second carrier members 14a, 14b through three shaft members 24 associated with the respective planetary rollers 22.

Each of the planetary rollers 22 has two inclined portions 22b formed on respective opposite sides in a direction of a rotation axis thereof. The inclined portions 22b are formed, respectively, in shapes symmetrically tapered toward respective opposite ends of the shaft member 24. Correspondingly, each of the outer rings 10, 12 has a curved-shaped (sectionally rounded-shaped) pressing surface 10b (12b) formed on one of opposite inner peripheral edges thereof (on the side facing the planetary rollers 22).

Preferably, each of the three components consisting of the sun roller 4, the planetary roller 22 and the outer ring 10 (12) is made of a material having a relatively high hardness, particularly, a material having a hardness equal to or greater than that of die steel. For example, the sun roller 4 may be made of a material prepared by subjecting a raw material based on SKH (i.e., one type of high-speed steel) defined by JIS G4403 to a quenching/tempering treatment at an appropriate temperature. The planetary roller 22 may be made of a material prepared by subjecting a raw material based on SKD (i.e., one type of alloy tool steel) defined by JIS G4404 to a quenching treatment at an appropriate temperature. The outer ring 10 (12) may be made of NAK (i.e., pre-hardened steel which is one type of die steel) (trade name of a material for a plastic molding die, produced by Daido Steel Co., Ltd.), directly without subjecting it to a quenching treatment.

More specifically, the sun roller 4, the planetary roller 22 and the outer ring 10 (12) may be made, respectively, of SKH 51, SKD 11 and NAK 55 (trade name, produced by Daido Steel Co., Ltd.). The SKH 51 for the sun roller 4, the SKD 11 for the planetary roller 22, and the NAK 55 for the outer ring 10 (12), have micro-Vickers hardnesses Hv of about 700, about 520 and about 450, respectively.

In this embodiment, each of the three components consisting of the sun roller 4, the planetary roller 22 and the outer ring 10 (12) is made of a material having a hardness set to become higher in descending order of surface velocity in respective press contact portions of the three components. Specifically, each of the sun roller 4, the planetary roller 22 and the outer ring 10 (12) is made of a material having a hardness set to become higher in this order. In this case, as compared with a case where each of the three components is made of the same material, a lifetime capable of satisfying a target wow and flutter value can be extended about three times, under the same load condition. This makes it possible to retard performance deterioration due to seizing or wearing, and provide enhanced wear resistance.

Preferably, at least one of the three components consisting of the sun roller 4, the planetary roller 22 and the outer ring 10 (12), which is to be driven at a maximum value of surface velocity in respective press contact portions thereof, more specifically the sun roller 4, has a surface subjected to a micro-shot peening treatment (WPC treatment). This treatment includes bringing ceramic or glass particles having a diameter of about 10 μm (1 μm=1×10$^{-6}$ m) into collision with the surface of the component at sonic speed. This makes it possible to provide enhanced wear resistance to the sun roller 4.

In the sun roller 4 subjected to the micro-shot peening treatment, as compared with a case where it is not subjected to the treatment, a lifetime capable of satisfying a target wow and flutter value can be extended about 1.5 times, under the same load condition. This makes it possible to extend a lifetime of the traction-drive type driving-force transmission mechanism M.

Figure 8:
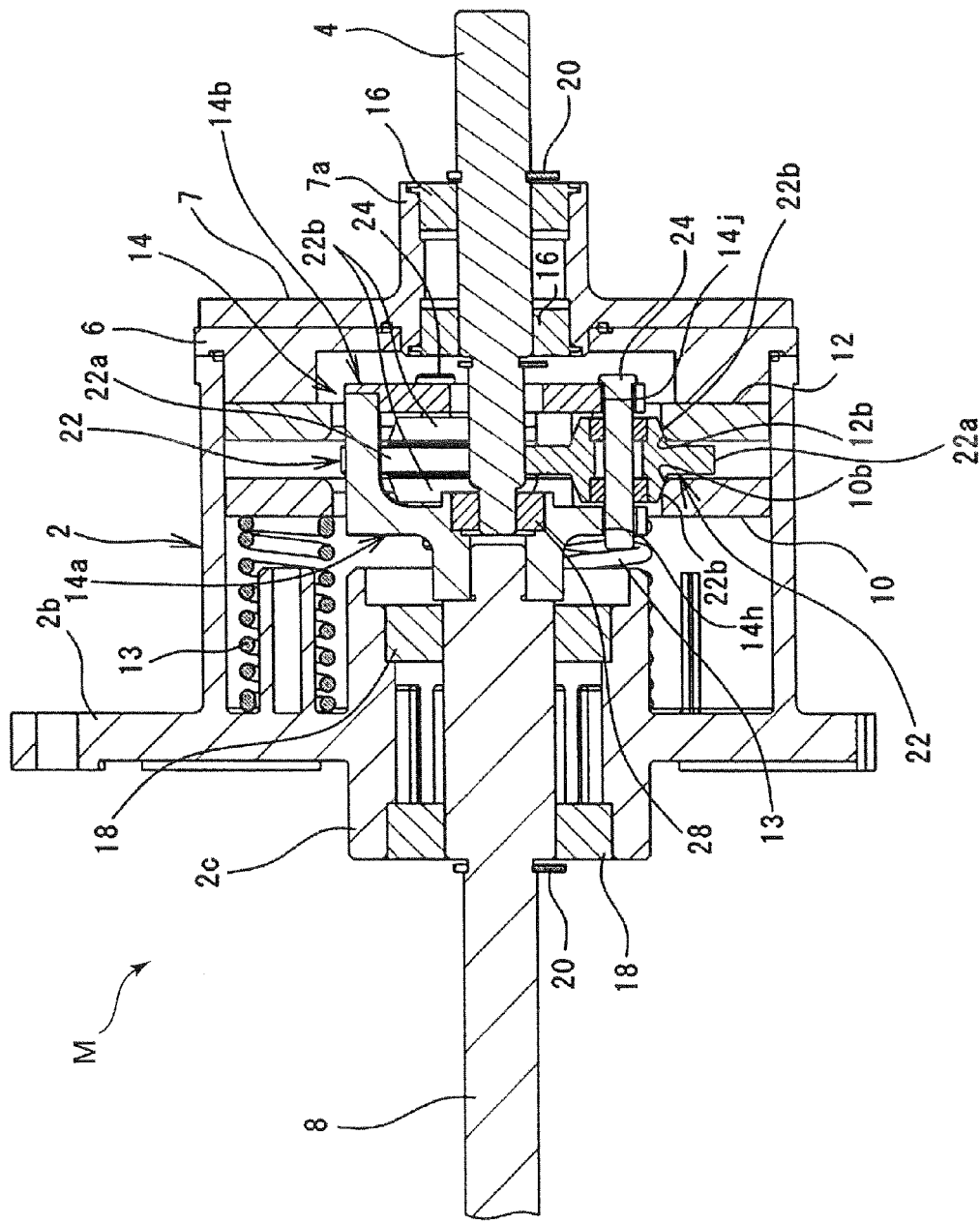
FIG. 8 is a vertical sectional view showing the traction-drive type driving-force transmission mechanism, taken along an axial direction thereof.

As for the output shaft 8, the first carrier member 14a and the output shaft 8 are composed, respectively, of separate components, and screwingly connected to each other. Specifically, as shown in FIGS. 8 and 9, the output shaft 8 has a screw portion 8a formed to extend toward the first carrier member 14a and have an external thread adapted to be tightened in a direction of a torque to be received by the output shaft 8.

Thus, as compared with a case where the first carrier member 14a and the output shaft 8 are integrally formed as a single component, a machining process can be simplified to facilitate reduction in cost, and an operation of assembling/disassembling the first carrier member 14a and the output shaft 8 can also be facilitated. The output shaft 8 is screwed with the first carrier member 14a in a direction allowing the output shaft 8 to be tightened in a driven state thereof, as described above. Thus, as long as the output shaft 8 is screwed with the first carrier member 14a, with an adequate tightening torque during assembling, any rotational fluctuation (driving delay) due to defective tightening never occurs in a rotation direction of the output shaft 8 for a moment during actual use. Therefore, the connection between the first carrier member 14a and the output shaft 8 will be reliably maintained.

Figure 9:
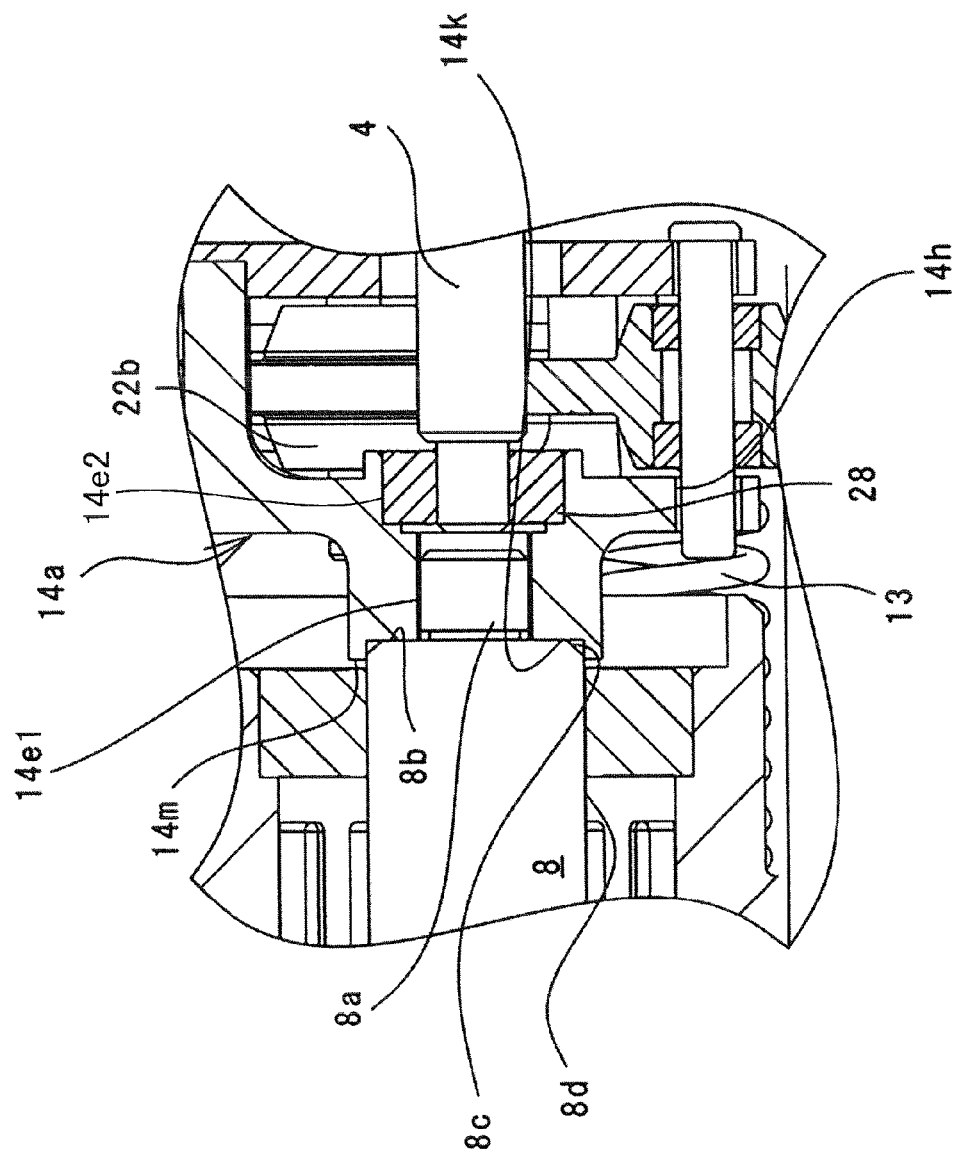
FIG. 9 is a fragmentary enlarged view of the traction-drive type driving-force transmission mechanism in FIG. 8.

Referring to FIG. 9, the output shaft 8 has a contact surface 8b formed on a radially outward side relative to the screw portion 8a, and a C-surface portion (chamfered portion) 8c on a radially outward side relative to the contact surface 8b.

Correspondingly, the first carrier member 14a has an aftermentioned first hole portion 14e1 which is formed with an internal thread adapted to be screwed onto the screw portion 8a. Further, the first carrier member 14a has a receiving portion 14k formed in a position facing the contact surface 8b. This receiving portion 14k is formed as a concave portion which extends in a direction away from the output shaft 8 to have a surface in contact with the contact surface 8b and receive therein the C-surface portion 8c. Furthermore, the first carrier member 14a has a convex portion 14m located on a radially outward side relative to the receiving portion 14k to surround an outer peripheral surface 8d of the output shaft 8.

As above, the output shaft 8 is formed to have a two-step structure in a direction from the screw portion 8a to the outer peripheral surface 8d, so that the screw portion 8a can be screwed with the first hole portion 14e1 of the first carrier member 14a to guide a movement of the output shaft 8, and then the contact surface 8b can come into contact with the receiving portion 14k of the first carrier member 14a to ensure centering of the output shaft 8 with respect to the first carrier member 14a. Thus, an axial perpendicularity of the output shaft 8 relative to a center of the first carrier member 14a is ensured to suppress small wobbling in the rotation direction, as compared with a case where the output shaft 8 is simply screwed with the first carrier member 14a. In addition, the output shaft 8 is formed with the C-surface portion 14c. Thus, after the screw portion 8a is inserted into the first hole portion 14e1, the output shaft 8 is fitted in the first carrier member 14a. This makes it possible to more reliably ensure the axial perpendicularity relative to the center of the first carrier member 14a.

Returning to FIG. 3, in an internal space of the casing 2, the first outer ring 10 is pressed in the direction coming close to the second outer ring 12, by the repulsion force of the compression coil springs 13, as described above. Each of the outer rings 10, 12 has an inner diameter greater than the outer diameter of the planetary carrier 14, and therefore does not interfere with the planetary carrier 14. In this state, the first and second outer rings 10, 12 are located in adjacent relation to each other while sandwiching the three planetary rollers 22 therebetween, as shown in FIG. 2. In this embodiment, the pressing surfaces 10b, 12b of the first and second outer rings 10, 12 are strongly pressed against the respective inclined portions 22b of each of the planetary rollers 22 to apply a force to the inclined portions 22b in a radial direction of the sun roller 4 so as to strongly press each of the planetary rollers 22 against the sun roller 4 in the radial direction of the sun roller 4.

Figure 5:
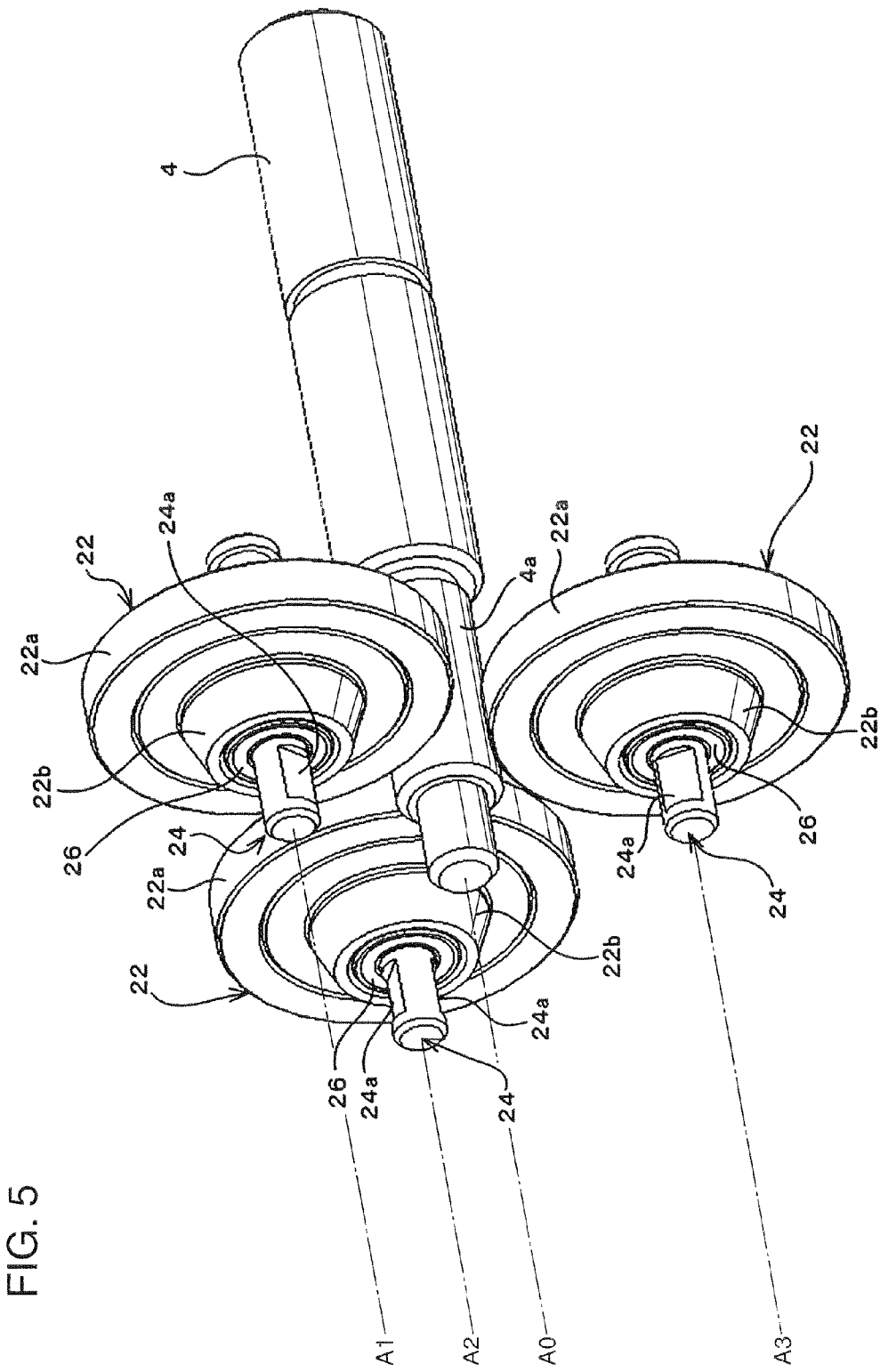
FIG. 5 is a perspective view showing an arrangement of three planetary rollers relative to a sun roller.

FIG. 5 is a perspective view showing an arrangement of the three planetary rollers 22 relative to the sun roller 4, in a state after the planetary carrier 14 and the outer rings 10, 12 are separated therefrom. The three planetary rollers 22 are disposed on respective ones of three adjacent axes each parallel to a rotation axis A0 (i.e., first central axis) of the sun roller 4, and at even intervals (at intervals of 120 degrees) in a circumferential direction of the sun roller 4. That is, the three planetary rollers 22 supported by the respective shaft members 24 are arranged around the sun roller 4, in such a manner that each of three central axes A1, A2, A3 of the shaft members 24 (i.e., second central axis; rotation axis of each of the planetary rollers 22) is aligned with a respective one of the three adjacent axes, i.e., each of the central axes A1, A2, A3 becomes parallel to the rotation axis A0. In this state, each of the three planetary rollers 22 is disposed such that an outer peripheral surface 22a thereof comes close to an outer peripheral surface 4a of the sun roller 4.

In order to strongly press each of the planetary rollers 22 against the sun roller 4 in the radial direction of the sun roller 4, it is necessary for each of the planetary rollers 22 to be movable in the radial direction of the sun roller 4. Thus, in this embodiment, the following structure is employed for the planetary carrier 14 and each of the shaft members 24.

Figure 6A:
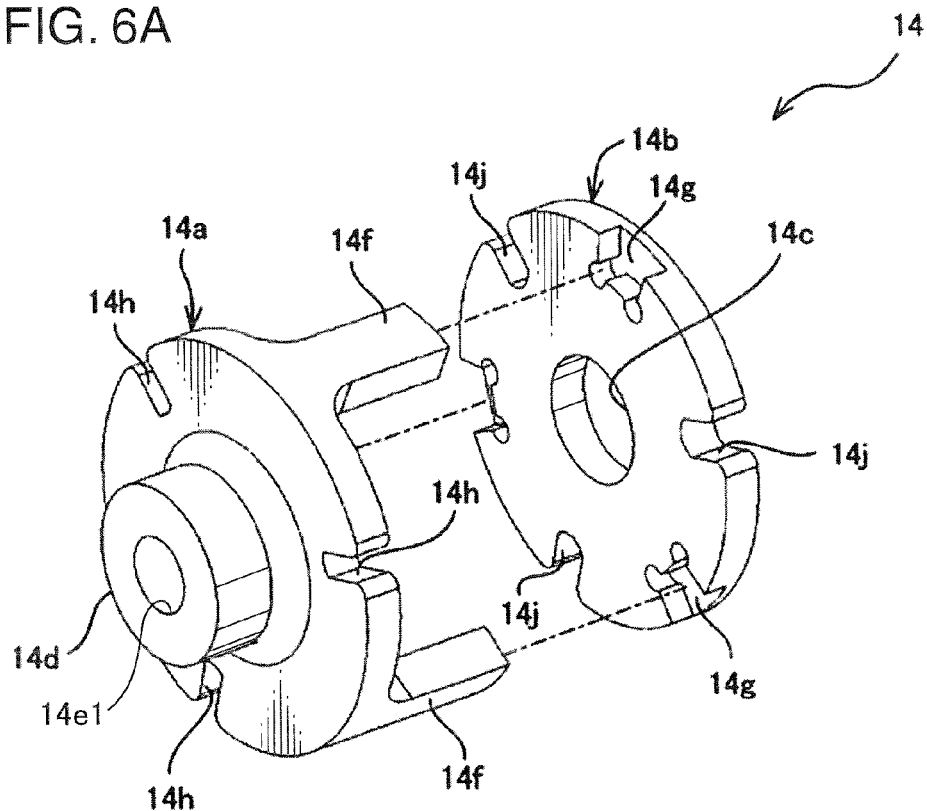
FIGS. 6A and 6B are exploded perspective views of the planetary carrier.
Figure 6B:
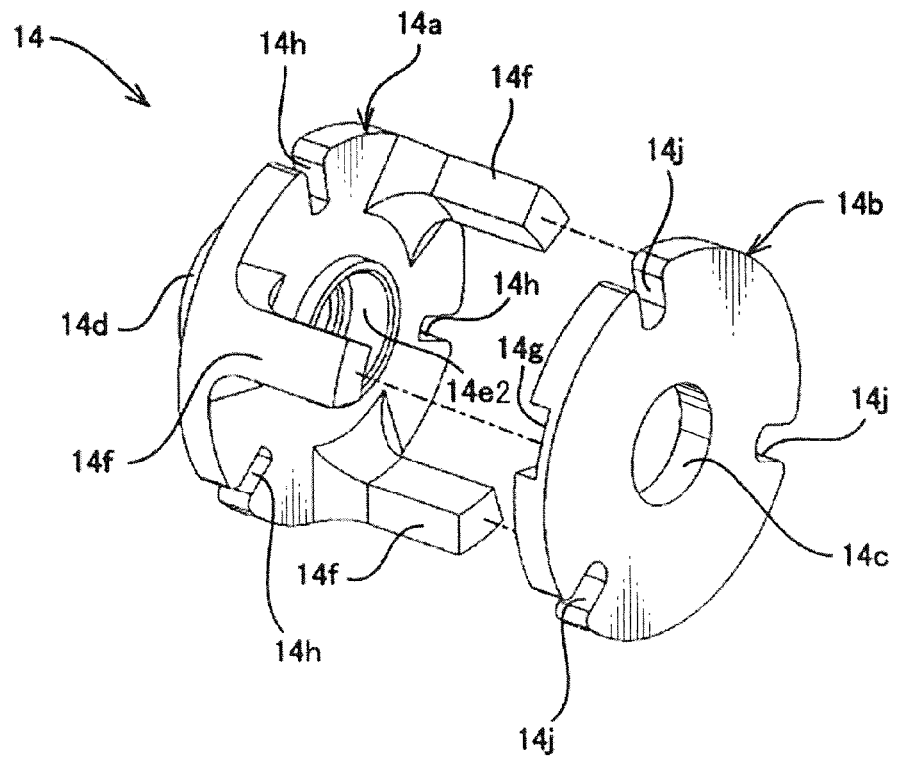

FIGS. 6A and 6B are exploded perspective views of the planetary carrier 14. In the planetary carrier 14, the first carrier member 14a is disposed on the side of the distal end of the sun roller 4, and the second carrier member 14b is disposed on the side of a base end of the sun roller 4 in spaced-apart relation to the first carrier member 14a in the rotation axis of the sun roller 4. Each of the first and second carrier members 14a, 14b generally has a flange (pierced disk) shape.

The second carrier member 14b has an insertion hole 14c formed in a central region thereof. The insertion hole 14c has a diameter greater than that of the sun roller 4, and therefore the second carrier member 14b can be freely rotated around the sun roller 4.

As shown in FIG. 6A, the first carrier member 14a has a boss portion 14d formed in a central region thereof. The base end of the output shaft 8 is fitted (press-fitted) into the boss portion 14d. As shown in FIG. 6B, the first carrier member 14a also has a second hole portion 14e2 formed on an opposite side of the boss portion 14d (on the side facing the second carrier member 14b). The distal end of the sun roller 4 is rotatably supported by the second hole portion 14e2 through a bearing (not shown in FIG. 6B; indicated by the reference nonmetal 28 in FIG. 8).

The first carrier member 14a has three connection portions 14f formed on an outer peripheral edge thereof. The connection portions 14f are arranged at even intervals (at intervals of 120 degrees) in a circumferential direction of the first carrier member 14a. In a post-assembly state of the planetary carrier 14, each of the connection portions 14f extends from the first carrier member 14a toward the second carrier member 14b in parallel relation to the sun roller 4. The second carrier member 14b disposed in opposed relation to the first carrier member 14a has three fitting concave portions 14g formed correspondingly to the respective connection portions 14f. Each of the fitting concave portions 14g is formed to be concaved from a surface of the second carrier member 14b facing the first carrier member 14a, in a thicknesswise direction of the second carrier member 14b.

The connection portions 14f are fitted into the corresponding fitting concave portions 14g to assemble the first and second carrier members 14a, 14b of the planetary carrier 14 together in such a manner that a distance therebetween in a direction of the rotation axis of the sun roller 4 is unchangeably maintained. Particularly, in this embodiment, the connection portions 14f and the fitting concave portions 14g are machined with a high degree of accuracy, and fitted together with a high degree of accuracy, to limit a displacement (wobbling movement) thereof in the rotation direction about the rotation axis, in a significantly small range.

The first carrier member 14a has three guide grooves (i.e., first U-shaped groove) 14h formed in the outer peripheral edge thereof. The second carrier member 14b has three guide grooves (i.e., second U-shaped grooves) 14j formed at positions corresponding to respective positions of the guide grooves 14h in the rotation axis of the sun roller 4. The guide grooves 14h (14j) are arranged at even intervals (at intervals of 120 degrees) in the circumferential direction of the first (second) carrier member 14a (14b), and each of the guide grooves 14h (14j) is formed to extend from the outer peripheral edge toward a rotation axis (radially central region) of the first (second) carrier member 14a (14b). In this embodiment, each of the guide grooves 14j is formed to have a width greater than that of each of the guide grooves 14h.

Figure 7:
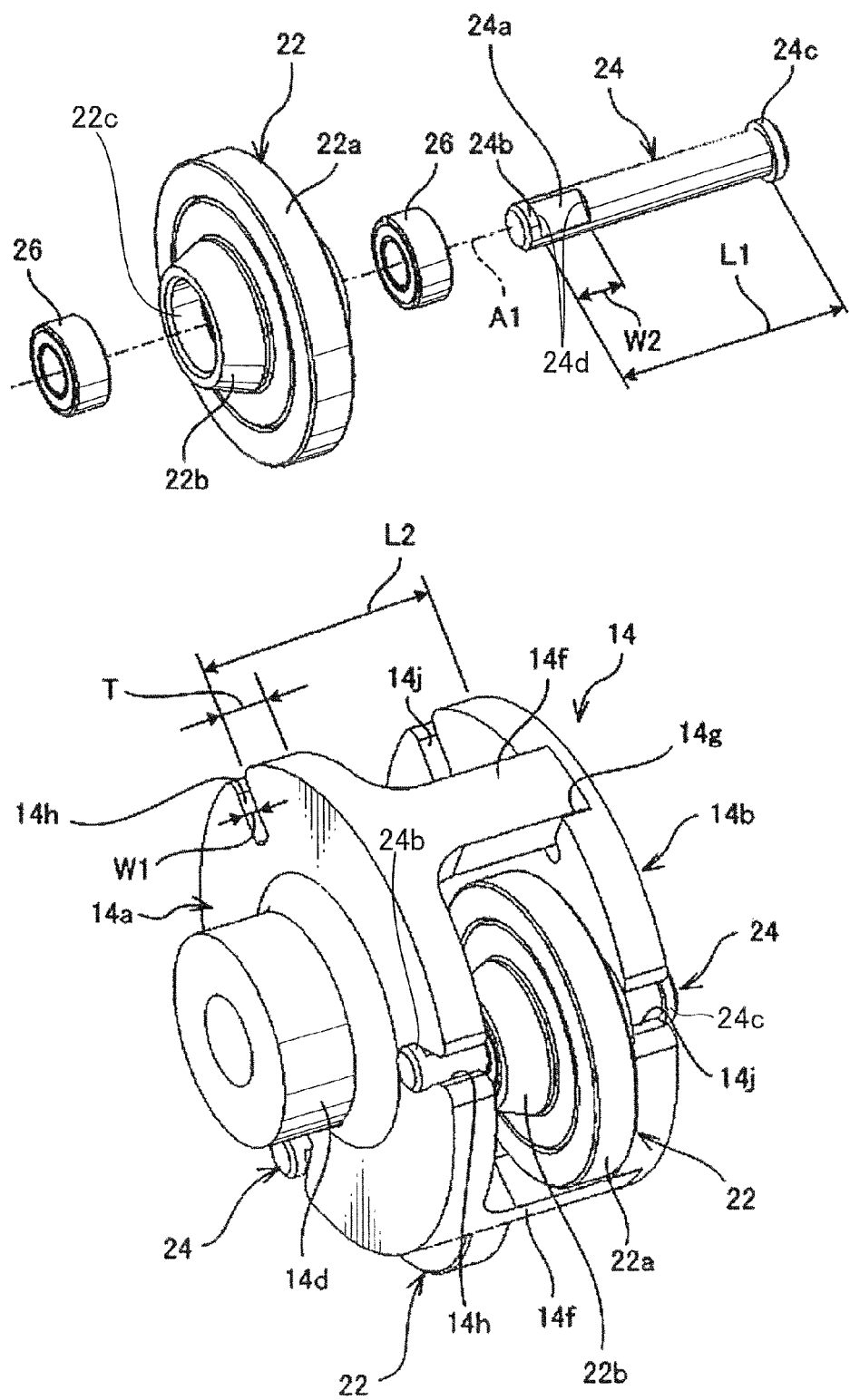
FIG. 7 is an exploded perspective view showing a part (one) of the planetary rollers separated from the planetary carrier.

FIG. 7 is an exploded perspective view showing a part (one) of the planetary rollers 22 separated from the planetary carrier 14. Each of the planetary rollers 22 has an insertion hole 22c formed in a central region thereof. In a state after the shaft member 24 is inserted into the insertion hole 22c, the planetary roller is rotatably attached to the shaft member 24 through two bearings 26.

Each of the shaft members 24 for the planetary rollers 22 has a pair of parallel surfaces 24a formed on an outer peripheral surface of one end thereof in opposed relation to each other. The parallel surfaces 24a are formed by cutting out a part of the outer peripheral surface of the one end of the shaft member 24. Although only one of the parallel surfaces 24a is shown in FIG. 7, the pair of parallel surfaces 24a are located symmetrically with respect to an axis (indicated by the reference code A1 in FIG. 7) of the shaft member 24 and in parallel relation to each other. That is, the one end of the shaft portion 24 having the parallel surfaces 24a is formed as an oval-shaped portion (i.e., a portion having an oval shape in section).

Each of the pair of parallel surfaces 24a is located on a slightly inward side relative to one edge of the shaft member 24 (i.e., on the side of a center of the shaft member 24 in a direction of the axis A1). Thus, a sectionally circular-shaped portion remains in the one end of the shaft member 24 on an outward side relative to the parallel surfaces 24a (i.e., on the side of the one edge of the shaft member 24). This portion serves as a latch portion 24b. In a state after the shaft member 24 is fitted into the guide groove 14h, the latch portion 24b is disposed to protrude from the first carrier member 14a outwardly (i.e., in a direction opposite to the planetary roller 22), and retained by an outer surface of the first carrier member 14a (i.e., a surface of the first carrier member 14a located on an opposite side of the planetary roller 22).

Each of the shaft members 24 has a flange-shaped (stepped pin-shaped) latch portion 24c formed in the other edge thereof. In a state after the shaft member 24 is fitted into the guide groove 14j as shown in FIG. 7, the latch portion 24c is also disposed to protrude from the second carrier member 14b outwardly (i.e., in a direction opposite to the planetary roller 22), and retained by an outer surface of the second carrier member 14b (i.e., a surface of the second carrier member 14b located on an opposite side of the planetary roller 22).

As above, in this embodiment, the latch portions 24b, 24c are formed on the respective opposite edges of each of the shaft members 24. Thus, in the state after the shaft member 24 is fitted into the guide grooves 14h, 14j, the two latch portions 24b, 24c prevent the first and second carrier members 14a, 14b from being separated from each other so as to maintain the fitted state therebetween. Particularly, in this embodiment, an internal dimension (indicated by the reference code L1 in FIG. 7) between the two latch portions 24b, 24c is set to be slightly greater than a thickness dimension (indicated by the reference code L2 in FIG. 7) of the entire planetary carrier 14. Thus, in the state after the shaft member 24 is fitted into the guide grooves 14h, 14j, the shaft member 24 can be freely displaced in the radial direction of the sun roller 4.

In this embodiment, with a view to allowing each of the shaft members 24 to be displaceable only in the radial direction of the sun roller 4 while restricting any other displacement, the planetary carrier 14 and each of the shaft members 24 have the following structural features.

(1) Firstly, a width (distance) between the pair of parallel surfaces 24a is set to be slightly less than a width (indicated by the reference code W1 in FIG. 7) of the guide groove 14h, in a radial direction of the shaft member 24. Specifically, the parallel surfaces 24a (i.e., the oval-shaped portion) are fitted into the guide groove 14h highly accurately with a slight gap, in the radial direction of the shaft member 24. Thus, while the shaft member 24 is displaceable along the guide groove 14h, in the radial direction of the sun roller 4, a rotational displacement of the shaft member 24 about the central axis A1 is restricted.

(2) Secondly, with a focus on a longitudinal width (indicated by the reference code W2 in FIG. 7) of each of the parallel surfaces 24a, the width W2 is set to be slightly greater than a thickness (indicated by the reference code T in FIG. 7) of the first carrier member 14a. That is, the parallel surfaces 24a (i.e., the oval-shaped portion) are fitted into the guide groove 14h highly accurately with a slight gap, in a longitudinal direction of the shaft member 24 (i.e., in a direction of the central axis A1). Thus, while the shaft member 24 is displaceable along the guide groove 14h, in the radial direction of the sun roller 4, a displacement of the shaft member 24 in the longitudinal direction thereof (a direction along the central axis A1) is restricted.

Further, a displacement of the shaft member 24 in a direction causing inclination of the central axis A1 (i.e., a rotation of the central axis A1 in a plane along the radial direction of the sun roller 4) is restricted. Specifically, two sectionally circular-shaped portions 24d are located on respective ones of opposite sides of the parallel surfaces 24a in the longitudinal direction of the shaft member 24. Thus, in a state after the parallel surfaces 24a are fitted into the guide groove 14h, even if a certain force which otherwise causes inclination of the shaft member 24 is applied, one of the sectionally circular-shaped portions 24d is brought into contact with the outer or inner surface of the first carrier member 14a to prevent the inclination of the shaft member 24.

This makes it possible to allow each of the shaft members 24 to be displaceable along the guide groove 14h only in the radial direction of the sun roller 4, while restricting any other displacement.

The two bearings 26 are fitted into the planetary roller 22 from respective opposite sides along the rotation axis of the planetary roller 22. In this embodiment, a dimensional tolerance for each component including the planetary roller 22, the bearings 26 and the shaft member 24 is set at a significantly small value. Thus, the planetary roller 22 can be assembled with the shaft member 24 as a substantially single piece, and displaced only in the radial direction of the sun roller 4 within the planetary carrier 14.

Based on the above structure, each of the shaft members 24 of the three planetary rollers 22 can be displaced in the radial direction of the sun roller 4 along the guide grooves 14h, 14j of the first and second carrier members 14a, 14b, while maintaining the parallel relationship between each of the central axes A1, A2, A3 and the rotation axis A0 (see FIG. 5) of the sun roller 4.

In the traction-drive type driving-force transmission mechanism M, a sliding displacement of the shaft member 24 (or the planetary roller 22) relative to the planetary carrier 14 is a critical factor. In this embodiment, with a view to allowing for a smooth displacement of the shaft member 24, the oval-shaped portion is formed only in one end of the shaft member 24, and the other end is maintained in a sectionally circular shape, as described above. Specifically, if the oval-shaped portion is formed in each of the opposite ends, a machining error is likely to cause the occurrence of an angular difference between two pairs of parallel surfaces 24a on the respective opposite ends. This angular difference immediately exerts an adverse effect on the sliding displacement of the shaft member 24 to cause edge contact of the planetary roller 22 and consequently cause uneven wear of the sun roller 4. On this point, in this embodiment, the oval-shaped portion is formed only in one end of the shaft member 24. This is effective in allowing the planetary roller 22 to be evenly pressed against the sun roller 4 without the risk of the occurrence of angular difference.

An operation of the traction-drive type driving-force transmission mechanism M will be described below. FIG. 8 is a vertical sectional view showing the traction-drive type driving-force transmission mechanism M, taken along an axial direction thereof.

In the post-assembly state of the traction-drive type driving-force transmission mechanism M, the second outer ring 12 is in contact with an inner surface of the end plate 6, and fixedly positioned in this state. The first outer ring 10 is pressed in the direction coming close to the second outer ring 12 by the repulsion force of the compression coil springs 13. Thus, the pressing surfaces 10b, 12b of the first and second outer rings 10, 12 sandwichingly press the respective inclined surfaces 22b of each of the planetary rollers 22 from opposite sides thereof, and thereby each of the planetary rollers 22 is displaced in a direction coming close to the sun roller 4 along the radial direction of the sun roller 4. Consequently, each of the planetary rollers 22 is strongly pressed against the sun roller 4. When each of the planetary rollers 22 becomes unable to have a further displacement, the first outer ring 10 is also stopped at that point.

In this state, an ultrahigh-pressure is developed (in a fine gap) between each of the planetary rollers 22 and the sun roller 4 in the internal space of the casing 2, to allow grease residing in the fine gap to exert its elasto-plastic property so as to generate an adequate traction force during rotation of the sun roller 4. When each of the three planetary rollers 22 is rotated in a direction opposite to that of the sun roller 22 through means of the traction force, the movement is transmitted to the planetary carrier 14 through each of the shaft members 24. Thus, the entire planetary carrier 14 is rotated in the same direction as that of the sun roller 4. This rotation of the planetary carrier 14 is picked up from the output shaft 8, so that a torque input into the sun roller 4 can be transmitted to the output shaft 8 with an accurate speed reduction ratio. Thus, the traction-drive type driving-force transmission mechanism can be used as a speed reducer.

A speed reducer using the traction-drive type driving-force transmission mechanism M according to this embodiment allows a torque to be smoothly transmitted without an influence of backlash as in a gear transmission mechanism. Thus, it is suitable as a driving source for an apparatus in which a rotational angle is required to be controlled with a high degree of accuracy.

The traction-drive type driving-force transmission mechanism M according to this embodiment is designed such that the central axis of the shaft member 24 of each of the planetary rollers 22 (i.e., the rotation axis of each of the planetary rollers 22) can be displaced only in the radial direction of the sun roller 4 while maintaining the parallel relationship with the rotation axis of the sun roller 4. This makes it possible to avoid inclination of the rotation axis of the planetary roller 22 relative to the rotation axis of the sun roller 4 so as to reliably prevent uneven wear of the sun roller 4 due to edge contact of the planetary roller 22. Thus, the traction-drive type driving-force transmission mechanism M can maintain adequate durability over an extended time period, and continuously function until a lifetime limit of an apparatus equipped therewith.

Figure 10:
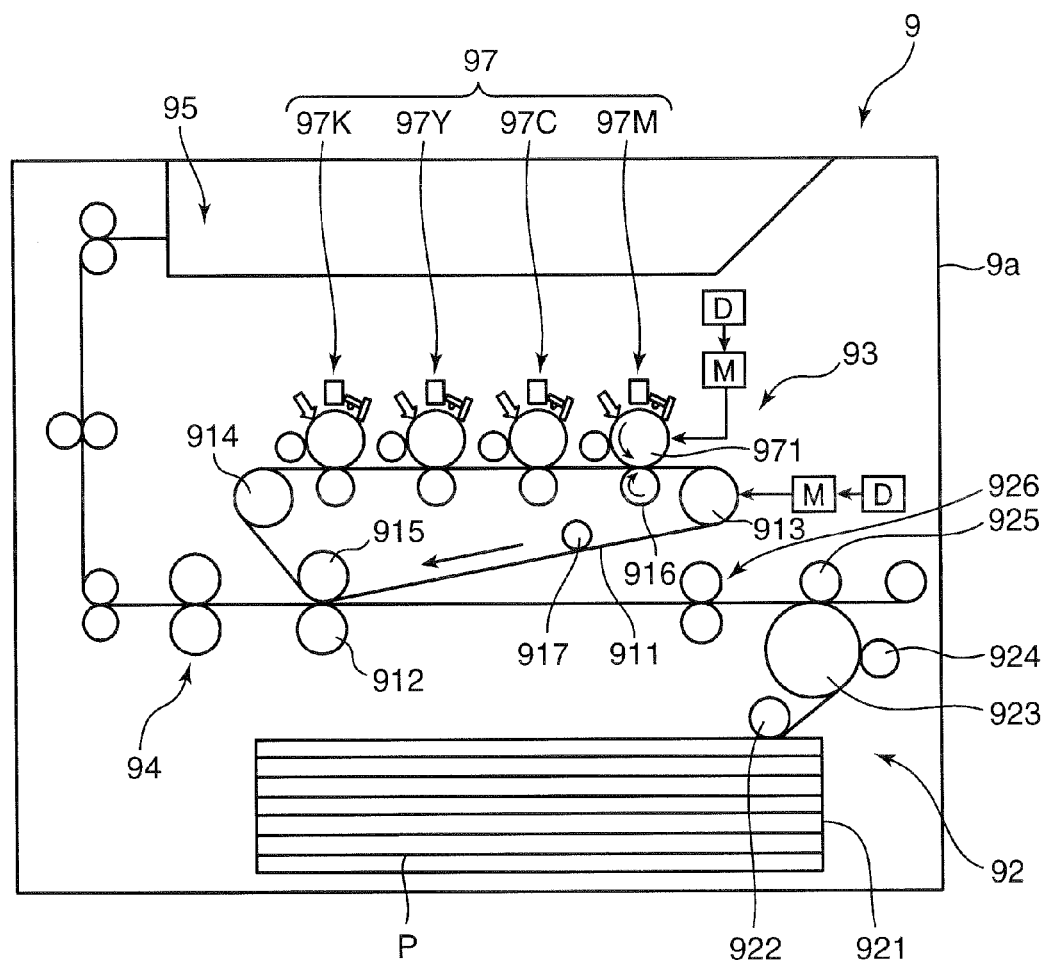
FIG. 10 is a schematic sectional view showing one example of an image forming apparatus according to one embodiment of the present invention.

An apparatus suitable for using the traction-drive type driving-force transmission mechanism M according to this embodiment may include a full-color image forming apparatus, by way of example. FIG. 10 is a schematic sectional view showing a general structure of a tandem-type color printer 9 as one example of a full-color image forming apparatus.

The color printer 9 includes a sheet feed section 92 operable to feed a sheet P, an image forming section 93 operable to transfer an image onto the sheet P while transporting the sheet P fed from the sheet feed section 92, and a fixing section 94 operable to subject the image transferred on the sheet P in the image forming section 93 to a fixing process, which are housed in a box-shaped apparatus body 9a thereof. The apparatus body 9a has an upper surface formed as a catch tray section 95 adapted to receive the sheet P after being subjected to the fixing process in the fixing section 94.

The sheet feed section 92 is provided with a sheet feed cassette 921 adapted to store therein a plurality of sheets P, a pickup roller 922, three sheet feed rollers 923, 924, 925, and a registration roller 926. The image forming section 93 is provided with an image forming unit 97, an intermediate transfer belt 911 adapted to allow a toner image to be primarily transferred onto a surface thereof by the image forming unit 97, and a secondary transfer roller 912 operable to secondarily transfer the toner image on the intermediate transfer belt 911, onto the sheet P sent from the sheet feed cassette 921.

The image forming unit 97 includes a black unit 97K, a yellow unit 97Y, a cyan unit 97C and a magenta unit 97M, which are disposed from an upstream side (left side in FIG. 10) to an downstream side, in this order. Each of the units 97K, 97Y, 97C, 97M has a photosensitive drum 971 disposed at a central position thereof to serve as an image support member. The photosensitive drum 971 is adapted to be drivenly rotated in a counterclockwise direction in FIG. 10. A charger unit, an exposure unit, a developing unit, a cleaning unit and an eraser unit are disposed around the photosensitive drum 971 from an upstream side of a rotation direction of the photosensitive drum 971, in this order.

The intermediate transfer belt 911 comprises an endless belt-shaped rotatable member wound around a drive roller 913, a belt support roller 914, a backup roller 915, four primary transfer rollers 916 and a tension roller 917, in such a manner that an outer surface thereof is kept in contact with outer peripheral surfaces of the respective photosensitive drums 971 of the units 97K, 97Y, 97C, 97M. The intermediate transfer belt 911 is adapted to be endlessly rotated by the plurality of rollers while being pressed against each of the photosensitive drums 971 by a corresponding one of the primary transfer rollers 916 which are disposed in opposed relation to the respective photosensitive drums 971.

Toner images formed on the respective photosensitive drums 971 are sequentially transferred (primarily transferred) onto the intermediate transfer belt 911 circulatingly rotated in the arrowed direction (clockwise direction) according to driving of the drive roller 913, in a superimposed manner, to form a full-color toner image. This full-color toner image is secondarily transferred onto the sheet P in a nip zone defined between the secondary transfer roller 912 and the backup roller 915. The sheet P having the full-color toner image transferred thereon is subjected to the fixing process in the fixing section 94, and then ejected to the catch tray section 95.

In the above color printer 9, the aforementioned traction-drive type driving-force transmission mechanism M may be connected to a driving system for a component to be drivenly rotated. Particularly, the traction-drive type driving-force transmission mechanism is preferably applied to a driving component for the image forming section 93, such as the photosensitive drum 971 and/or the intermediate transfer belt 911. A rotational driving force of a motor D (serving as a driving source) may be transmitted to a rotary shaft (serving as a driving component) of the photosensitive drum 971 or the drive roller 913 (serving as a driving component) operable to drive the intermediate transfer belt 911, through the traction-drive type driving-force transmission mechanism M. In this case, as compared with gear drive, transmission loss and uneven driving can be suppressed to achieve higher-quality image forming. Further, a stepping motor may be used as the motor. In this case, according to a pulse control of the stepping motor, a rotational angle of the photosensitive drum 971 or the like can be controlled with a high degree of accuracy to achieve significant high-quality image forming.

While the present invention has been described based on the traction-drive type driving-force transmission mechanism M according to one embodiment thereof, the present invention is not limited to the embodiment. For example, the above embodiment may be modified as follows.

The above embodiment has been described by taking one example where each of the planetary rollers 22 is attached to the shaft member 24 through the bearings 26. Alternatively, each of the planetary rollers 22 may be designed such that it is integrally rotated together with a shaft member. In this case, the planetary carrier 14 may be designed to have a bearing in a slidable manner, and displaceably guide the shaft member together with the bearing in the radial direction of the sun roller 4.

The respective components consisting of the sun roller 4, the planetary roller 22 and the outer ring 10 (12) are in press contact with each other in the internal space of the casing 2. At least one of these components may be provided with a circulation member adapted to forcedly circulate the grease inside the casing 2.

Figure 11:
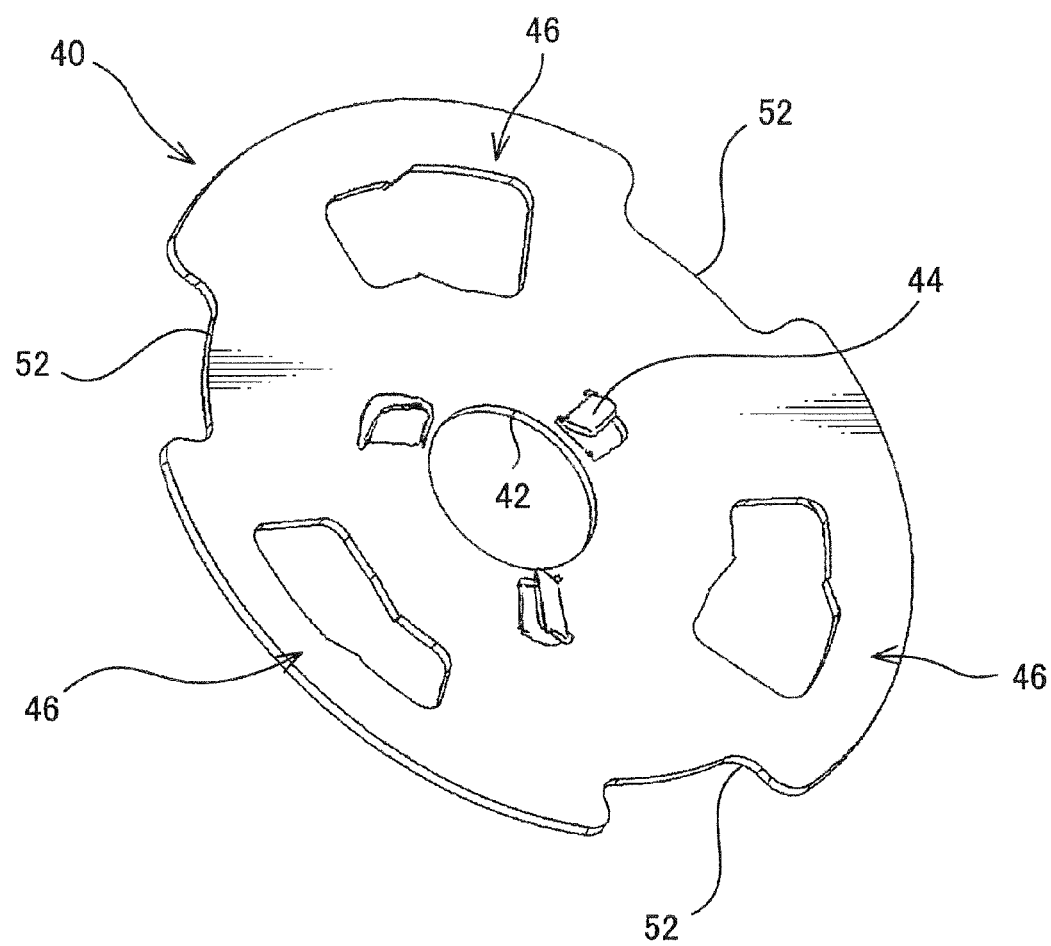
FIG. 11 is a perspective view showing one example of a circulation member.

FIG. 11 is a perspective view showing one example of the circulation member 40. The circulation member 40 is disposed on the side of the outer surface of the second carrier member 14b. The circulation member 40 has a hole 42 formed in a central region thereof to allow the sun roller 4 to be inserted thereinto. The circulation member 40 further has a three cut-and-erected fins 44 formed at appropriate positions on a radially outward side relative to the hole 42 and arranged at even intervals (at intervals of 120 degrees), and three engagement portions 46 formed at appropriate positions on a radially outward side relative to the cut-and-erected fins 44 and arranged at even intervals (at intervals of 120 degrees). Each of the engagement portions 46 is engaged with a corresponding one of the shaft members 24.

In a post-assembly state of the above circulation member 40, the cut-and-erected fins 44 are operable to forcedly circulate the lubricant in the casing 2 and send the lubricant toward a press contact portion between the sun roller 4 and each of the planetary rollers 22. This makes it possible to prevent degradation of the lubricant so as to extend lifetime of the traction-drive type driving-force transmission mechanism, as compared with a case devoid of the circulation member.

The above specific embodiment primarily includes an invention having the following features.

A traction-drive type driving-force transmission mechanism according to one aspect of the present invention comprises: a sun roller having a first central axis wherein the sun roller is rotatable about the first central axis; a plurality of shaft members each having a second central axis wherein each of the shaft members is disposed such that the second central axis is aligned with a respective one of a plurality of adjacent axes parallel to the first central axis; a plurality of planetary rollers rotatably arranged along an outer peripheral surface of the sun roller while being supported by respective ones of the shaft members; a guide member adapted to guide each of the shaft members displaceably in a radial direction of the sun roller while maintaining the parallel relationship between the first central axes and the second central axes; and a pressing member adapted to press each of the planetary rollers against the outer peripheral surface of the sun roller so as to allow a driving force to be transmitted through means of a traction force between the sun roller and each of the planetary rollers.

The traction-drive type driving-force transmission mechanism of the present invention is designed such that a rotation center of each of the planetary rollers (each of the shaft members) is displaced in the radial direction of the sun roller. Thus, based on a pressing force by which each of the planetary rollers is pressed against the outer peripheral surface of the sun roller, a traction force can be generated between each of the planetary rollers and the sun roller. In addition, even if each of the planetary rollers is displaced in the radial direction of the sun roller, the rotation center (second central axis) of the planetary roller is maintained in parallel relation to a rotation center (first central axis) of the sun roller. This makes it possible to evenly generate the traction force in an axial direction of the sun roller.

The traction-drive type driving-force transmission mechanism of the present invention may further comprise a bearing supporting each of the planetary rollers rotatably about a corresponding one of the shaft members, wherein the guide member is adapted to guide the shaft member itself displaceably in the radial direction of the sun roller together with the planetary roller.

According to this feature, the shaft member supports the planetary roller through the bearing without being rotated together with the planetary roller. In this state, the guide member guides the shaft member itself displaceably in the radial direction of the sun roller. This makes it possible to displace the planetary roller in the radial direction of the sun roller while maintaining the parallel relationship between the respective rotation center of the planetary roller and the sun roller.

In this case, the guide member preferably includes: a first carrier member supported about the first central axis in relatively rotatable relation to the sun roller; a second carrier member connected to the first carrier member with a distance therebetween in a direction of the first central axis, to support each of the shaft members in cooperation with the first carrier member while receiving the planetary rollers in a space defined relative to the first carrier member; and a plurality of guide grooves formed in each of the first and second carrier members to support corresponding ones of opposite ends of the shaft members displaceably in the radial direction of the sun roller.

According to this feature, a structure for allowing the shaft member to be displaced in the radial direction of the sun roller can be simply achieved by the first and second carrier members.

Preferably, in the above traction-drive type driving-force transmission mechanism, each of the shaft members includes an oval-shaped portion in one of the opposite ends thereof, wherein the oval-shaped portion has a pair of opposed parallel surfaces formed by cutting out a part of an outer periphery of the one end in conformity to a width of each of the guide grooves, and wherein a width of each of the parallel surfaces in a longitudinal direction of the shaft member is set to conform to a thickness of the first or second carrier member, whereby the oval-shaped portion restricts a displacement of the shaft member itself in a direction inclined relative to the sun roller.

According to this feature, the oval-shaped portion formed in the one end of the shaft member can suppress inclination of the shaft member itself to maintain the parallel relationship between the respective rotation axes of the planetary roller and the sun roller. In addition, the oval-shaped portion may be formed only in one of the opposite ends of the shaft member, and the other end may be maintained in a sectionally circular shape, so as to prevent the occurrence of an angular difference between the opposite ends due to machining error. This makes it possible to allow the shaft member to be smoothly displaced (slidingly moved) along the guide groove in a parallel displacement manner so as to generate an adequate traction force between the planetary roller and the sun roller.

Preferably, in the above traction-drive type driving-force transmission mechanism, the first carrier member has a connection portion extending in a longitudinal direction of the sun roller toward the second carrier member, and the second carrier member has a fitting concave portion formed to fittingly receive therein the connection portion in such a manner that the first and second carrier members are restricted relative to each other in a circumferential direction of the sun roller, wherein each of the shaft members has a pair of latch portions formed in the respective opposite ends thereof in such a manner as to be retained by respective outer surfaces of the first and second carrier members sandwiching the planetary rollers in the longitudinal direction of the sun roller, whereby the latch portions restrict the first and second carrier members from moving apart from each other so as to maintain the fitted state between the connection portion and the fitting concave portion.

According to this feature, the three components (the first carrier member, the second carrier member and the shaft members) can be assembled together based on only a fitting relationship therebetween without using any festinating means, such as screwing, by machining each of the components with a high degree of accuracy.

In the above traction-drive type driving-force transmission mechanism, the guide member may include a cylindrical-shaped carrier member supported about the first central axis in relatively rotatable relation to the sun roller. The carrier member may includes: a first circular plate having a hole formed in a radially central region thereof to allow a distal end of the sun roller to be received therein; and a second circular plate disposed with a distance relative to the first circular plate in a direction of the first central axis, and formed with an insertion hole in a radially central region thereof to allow the sun roller to penetrate therethrough. The first and second circular plates may be disposed across the planetary rollers in such a manner that a distance therebetween in the direction of the first central axis is unchangeably maintained. Further, the first circular plate may have a plurality of first U-shaped grooves each formed to extend from an outer peripheral edge toward the radially central region thereof, and the second circular plate may have a plurality of second U-shaped grooves each formed at a position corresponding to a respective one of the first U-shaped grooves in the direction of the first central axis to extend from an outer peripheral edge toward the radially central region thereof. Each of the first U-shaped grooves and a corresponding one of the second U-shaped grooves may be formed to receive one of opposite ends and the other end of each of the shaft members, respectively, and allow the shaft member to be slidingly displaced between a given first position and a second position closer to the radially central regions of the first and second circular plates relative to the first position, while maintaining the parallel relationship between the first central axes and the second central axes.

Preferably, in the traction-drive type driving-force transmission mechanism of the present invention, each of three components consisting of the sun roller, the planetary roller and the pressing member to be brought into press contact with each other is made of a material having a hardness set to become higher in descending order of surface velocity in respective press contact portions of the components. This feature makes it possible to suppress performance deterioration due to seizing or wearing, as compared with a case where the components are made of the same material and assembled together, so as to provide extended lifetime to the traction-drive type driving-force transmission mechanism.

Preferably, in the traction-drive type driving-force transmission mechanism of the present invention, each of three components consisting of the sun roller, the planetary roller and the pressing member to be brought into press contact with each other is made of a material having a hardness equal to or greater than that of at least die steel, and at least one of the components to be driven at a maximum value of surface velocity in respective press contact portions thereof has a surface subjected to a micro-shot peening treatment. This feature makes it possible to suppress performance deterioration due to wearing, as compared with a case where the component is not subjected to the treatment, so as to provide extended lifetime to the traction-drive type driving-force transmission mechanism.

Preferably, the traction-drive type driving-force transmission mechanism of the present invention further comprises an output shaft connected to the guide member in such a manner as to be drivenly rotated by the guide member, wherein the output shaft is screwed with the guide member in a direction allowing the output shaft to be tightened in a driven state thereof. According to this feature, the output shaft is screwed with the guide member in the direction allowing the output shaft to be tightened in a driven state thereof. This makes it possible to reliably maintain the connection between the guide member and the output shaft.

In this case, the output shaft preferably includes a screw portion which is screwed with the guide member, a contact surface located on a radially outward side relative to the screw portion and in contact with the guide member, and a chamfered portion located on a radially outward side relative to the contact portion. Further, the guide member preferably includes a hole which screwingly receives the screw portion, a receiving portion formed as a concave portion which extends in a direction away from the output shaft to have a surface in contact with the contact surface and receive therein the chamfered portion, and a convex portion located on a radially outward side relative to the receiving portion to surround an outer peripheral surface of the output shaft.

According to this feature, an axial perpendicularity of the output shaft relative to a center of the guide member is ensured to suppress small wobbling in the rotation direction, as compared with a case where the output shaft is simply screwed with the guide member. In addition, the output shaft is formed with the chamfered portion to more reliably ensure the axial perpendicularity relative to the center of the guide member.

Preferably, the traction-drive type driving-force transmission mechanism of the present invention further comprises a casing receiving therein the planetary rollers, the pressing member and a part of the sun roller, while being filled with a lubricant, and a circulation member disposed inside the casing, and adapted to forcedly circulate the lubricant. According to this feature, the lubricant is positively circulated toward the components in press contact with each other, by the circulation member. This makes it possible to prevent degradation of the lubricant so as to provide extended lifetime to the traction-drive type driving-force transmission mechanism.

The above traction-drive type driving-force transmission mechanism can properly manage a state (pressing state) when each of the planetary rollers is pressed against the sun roller, so as to allow each of the components to adequately maintain functions thereof until a lifetime limit of a material thereof while preventing uneven wear or the like in each of the components.

An image forming apparatus in another aspect of the present invention comprises: an image forming section including at least a photosensitive drum, or a photosensitive drum and an intermediate transfer belt; a driving source operable to generate a driving force for driving the photosensitive drum, or at least one of the photosensitive drum and the intermediate transfer belt; and a traction-drive type driving-force transmission mechanism operable to transmit the driving force of the driving source to a rotary shaft of the photosensitive drum, or a driving member of the intermediate transfer belt. The traction-drive type driving-force transmission mechanism includes: a sun roller having a first central axis wherein the sun roller is rotatable about the first central axis; a plurality of shaft members each having a second central axis wherein each of the shaft members is disposed such that the second central axis is aligned with a respective one of a plurality of adjacent axes parallel to the first central axis; a plurality of planetary rollers rotatably arranged along an outer peripheral surface of the sun roller while being supported by respective ones of the shaft members; a guide member adapted to guide each of the shaft members displaceably in a radial direction of the sun roller while maintaining the parallel relationship between the first central axes and the second central axes; and a pressing member adapted to press each of the planetary rollers against the outer peripheral surface of the sun roller so as to allow the driving force to be transmitted through means of a traction force between the sun roller and each of the planetary rollers.

In the image forming apparatus of the present invention, the traction-drive type driving-force transmission mechanism is connected to a driving system of the photosensitive drum and/or the intermediate transfer belt. This makes it possible to rotationally control the photosensitive drum and/or the intermediate transfer belt with a higher degree of accuracy as compared with gear drive, so as to achieve higher-quality image forming.

This application is based on patent application Nos. 2007-123211, 2007-294298, 2007-294299, 2007-294300 and 2007-294301 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A traction-drive type driving-force transmission mechanism comprising:
   a sun roller having a first central axis, said sun roller being rotatable about said first central axis;
   a plurality of shaft members each having a second central axis, each of said shaft members being disposed such that said second central axis is aligned with a respective one of a plurality of adjacent axes parallel to said first central axis;
   a plurality of planetary rollers rotatably arranged along an outer peripheral surface of said sun roller while being supported by respective ones of said shaft members;
   a guide member adapted to guide each of said shaft members displaceably in a radial direction of said sun roller while maintaining the parallel relationship between said first central axes and said second central axes; and a pressing member adapted to press an outer peripheral surface of each of said planetary rollers against said outer peripheral surface of said sun roller so as to allow a driving force to be transmitted through means of a traction force between said sun roller and each of said planetary rollers, wherein said pressing member includes two outer rings provided respectively with pressing surfaces, said two outer rings being disposed to sandwich said planetary rollers therebetween, and each of said planetary rollers has pressure-receiving surfaces disposed and configured to be pressed by said pressing surfaces to displace said planetary rollers in a direction toward said sun roller.

2. The traction-drive type driving-force transmission mechanism as defined in claim 1, which further comprises a bearing supporting each of said planetary rollers rotatably about a corresponding one of said shaft members, wherein said guide member is adapted to guide said shaft member itself displaceably in the radial direction of said sun roller together with said planetary roller.

3. The traction-drive type driving-force transmission mechanism as defined in claim 2, wherein said guide member includes:

a first carrier member supported about said first central axis in relatively rotatable relation to said sun roller;

a second carrier member connected to said first carrier member with a distance therebetween in a direction of said first central axis, to support each of said shaft members in cooperation with said first carrier member while receiving said planetary rollers in a space defined relative to said first carrier member; and a plurality of guide grooves formed in each of said first and second carrier members to support corresponding ones of opposite ends of said shaft members displaceably in the radial direction of said sun roller.

4. The traction-drive type driving-force transmission mechanism as defined in claim 3, wherein each of said shaft members includes an oval-shaped portion in one of the opposite ends thereof, said oval-shaped portion having a pair of opposed parallel surfaces formed by cutting out a part of an outer periphery of said shaft one end in conformity to a width of each of said guide grooves, wherein a width of each of said parallel surfaces in a longitudinal direction of said shaft member is set to conform to a thickness of said first or second carrier member, whereby said oval-shaped portion restricts a displacement of said shaft member itself in a direction inclined relative to said sun roller.

5. The traction-drive type driving-force transmission mechanism as defined in claim 4, wherein:

said first carrier member has a connection portion extending in a longitudinal direction of said sun roller toward said second carrier member;

said second carrier member has a fitting concave portion formed to fittingly receive therein said connection portion in such a manner that said first and second carrier members are restricted relative to each other in a circumferential direction of said sun roller; and each of said shaft members has a pair of latch portions formed in the respective opposite ends thereof in such a manner as to be retained by respective outer surfaces of said first and second carrier members sandwiching said planetary rollers in the longitudinal direction of said sun roller, whereby said latch portions restrict said first and second carrier members from moving apart from each other so as to maintain the fitted state between said connection portion and said fitting concave portion.

6. The traction-drive type driving-force transmission mechanism as defined in claim 2, wherein said guide member includes a cylindrical-shaped carrier member supported about said first central axis in relatively rotatable relation to said sun roller, said carrier member including:

a first circular plate having a hole formed in a radially central region thereof to allow a distal end of said sun roller to be received therein; and a second circular plate disposed with a distance relative to said first circular plate in a direction of said first central axis, and formed with an insertion hole in a radially central region thereof to allow said sun roller to penetrate therethrough, wherein:

said first and second circular plates are disposed across said planetary rollers in such a manner that a distance therebetween in the direction of said first central axis is unchangeably maintained;

said first circular plate has a plurality of first U-shaped grooves each formed to extend from an outer peripheral edge toward the radially central region thereof; and said second circular plate has a plurality of second U-shaped grooves each formed at a position corresponding to a respective one of said first U-shaped grooves in the direction of said first central axis to extend from an outer peripheral edge toward the radially central region thereof, wherein each of said first U-shaped grooves and a corresponding one of said second U-shaped grooves are formed to receive one of opposite ends and the other end of each of said shaft members, respectively, and allow said shaft member to be slidingly displaced between a given first position and a second position closer to the radially central regions of said first and second circular plates relative to said first position, while maintaining the parallel relationship between said first central axes and said second central axes.

7. The traction-drive type driving-force transmission mechanism as defined in claim 1, wherein each of three components consisting of said sun roller, said planetary roller and said pressing member to be brought into press contact with each other is made of a material having a hardness set to become higher in descending order of surface velocity in respective press contact portions of said components.

8. The traction-drive type driving-force transmission mechanism as defined in claim 1, wherein each of three components consisting of said sun roller, said planetary roller and said pressing member to be brought into press contact with each other is made of a material having a hardness equal to or greater than that of at least die steel, and at least one of said components to be driven at a maximum value of surface velocity in respective press contact portions thereof has a surface subjected to a micro-shot peening treatment.

9. The traction-drive type driving-force transmission mechanism as defined in claim 1, which further comprises an output shaft connected to said guide member in such a manner as to be drivenly rotated by said guide member, said output shaft being screwed with said guide member in a direction allowing said output shaft to be tightened in a driven state thereof.

10. The traction-drive type driving-force transmission mechanism as defined in claim 9, wherein:

said output shaft includes a screw portion which is screwed with said guide member, a contact surface located on a radially outward side relative to said screw portion and in contact with said guide member, and a chamfered portion located on a radially outward side relative to said contact portion; and said guide member includes a hole which screwingly receives said screw portion, a receiving portion formed as a concave portion which extends in a direction away from said output shaft to have a surface in contact with said contact surface and receive therein said chamfered portion, and a convex portion located on a radially outward side relative to said receiving portion to surround an outer peripheral surface of said output shaft.

11. The traction-drive type driving-force transmission mechanism as defined in claim 1, which further comprises:

a casing receiving therein said planetary rollers, said pressing member and a part of said sun roller, while being filled with a lubricant; and a circulation member disposed inside said casing, and adapted to forcedly circulate said lubricant.

12. An image forming apparatus comprising:

an image forming section including at least a photosensitive drum, or a photosensitive drum and an intermediate transfer belt;

a driving source operable to generate a driving force for driving said photosensitive drum, or at least one of said photosensitive drum and said intermediate transfer belt; and a traction-drive type driving-force transmission mechanism operable to transmit the driving force of said driving source to a rotary shaft of said photosensitive drum, or a driving member of said intermediate transfer belt, said traction-drive type driving-force transmission mechanism including:

a sun roller having a first central axis, said sun roller being rotatable about said first central axis;

a plurality of shaft members each having a second central axis, each of said shaft members being disposed such that said second central axis is aligned with a respective one of a plurality of adjacent axes parallel to said first central axis;

a plurality of planetary rollers rotatably arranged along an outer peripheral surface of said sun roller while being supported by respective ones of said shaft members;

a guide member adapted to guide each of said shaft members displaceably in a radial direction of said sun roller while maintaining the parallel relationship between said first central axes and said second central axes; and a pressing member adapted to press an outer peripheral surface of each of said planetary rollers against said outer peripheral surface of said sun roller so as to allow said driving force to be transmitted through means of a traction force between said sun roller and each of said planetary rollers, wherein said pressing member includes two outer rings provided respectively with pressing surfaces, said pair of outer rings being disposed to sandwich said planetary rollers therebetween, and each of said planetary rollers has pressure-receiving surfaces disposed and configured to be pressed by said pressing surfaces to displace said planetary rollers in a direction toward said sun roller.

* * * * *